US011894003B2

(12) United States Patent
Hirvonen et al.

(10) Patent No.: US 11,894,003 B2
(45) **Date of Patent: *Feb. 6, 2024**

(54) RECONSTRUCTION OF AUDIO SCENES FROM A DOWNMIX

(71) Applicant: DOLBY INTERNATIONAL AB, Dublin (IE)

(72) Inventors: Toni Hirvonen, Helsinki (FI); Heiko Purnhagen, Sundbyberg (SE); Leif Jonas Samuelsson, Sundbyberg (SE); Lars Villemoes, Jarfalla (SE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,204

(22) Filed: Feb. 10, 2023

(65) Prior Publication Data

US 2023/0267939 A1 Aug. 24, 2023

Related U.S. Application Data

(60) Continuation of application No. 17/219,911, filed on Apr. 1, 2021, now Pat. No. 11,580,995, which is a (Continued)

(51) Int. Cl.

*G10L 19/00* (2013.01)
*G10L 19/008* (2013.01)

(Continued)

(52) U.S. Cl.

CPC ........ *G10L 19/008* (2013.01); *G10L 19/0204* (2013.01); *G10L 19/20* (2013.01);

(Continued)

(58) Field of Classification Search

CPC ............... G10L 19/008; G10L 19/0204; G10L 19/20; G10L 25/06; H04S 3/02; H04S 3/008; H04S 5/00; H04S 7/30

(Continued)

(56) References Cited

U.S. PATENT DOCUMENTS 7,394,903 B2 7/2008 Herre et al.
7,567,675 B2 7/2009 Bharitkar (Continued)

FOREIGN PATENT DOCUMENTS

CN 101529504 9/2009
CN 101809654 8/2010

(Continued)

OTHER PUBLICATIONS

Boustead, P. et al "DICE: Internet Delivery of Immersive Voice Communication for Crowded Virtual Spaces" IEEE Virtual Reality, Mar. 12-16, 2005, pp. 35-41.

(Continued)

*Primary Examiner* — Md S Elahee

(57) ABSTRACT

Audio objects are associated with positional metadata. A received downmix signal comprises downmix channels that are linear combinations of one or more audio objects and are associated with respective positional locators. In a first aspect, the downmix signal, the positional metadata and frequency-dependent object gains are received. An audio object is reconstructed by applying the object gain to an upmix of the downmix signal in accordance with coefficients based on the positional metadata and the positional locators. In a second aspect, audio objects have been encoded together with at least one bed channel positioned at a positional locator of a corresponding downmix channel. The decoding system receives the downmix signal and the positional metadata of the audio objects. A bed channel is (Continued)

reconstructed by suppressing the content representing audio objects from the corresponding downmix channel on the basis of the positional locator of the corresponding downmix channel.

3 Claims, 5 Drawing Sheets

Related U.S. Application Data division of application No. 16/380,879, filed on Apr. 10, 2019, now Pat. No. 10,971,163, which is a continuation of application No. 15/584,553, filed on May 2, 2017, now Pat. No. 10,290,304, which is a continuation of application No. 14/893,377, filed as application No. PCT/EP2014/060732 on May 23, 2014, now Pat. No. 9,666,198.

(60) Provisional application No. 61/827,469, filed on May 24, 2013.

(51) Int. Cl.

| | |
|---|---|
| ***G10L 19/20*** | (2013.01) |
| ***H04S 5/00*** | (2006.01) |
| ***H04S 7/00*** | (2006.01) |
| ***G10L 19/02*** | (2013.01) |
| ***G10L 25/06*** | (2013.01) |
| ***H04S 3/00*** | (2006.01) |
| ***H04S 3/02*** | (2006.01) |

(52) U.S. Cl.

CPC .............. *G10L 25/06* (2013.01); *H04S 3/008* (2013.01); *H04S 3/02* (2013.01); *H04S 5/00* (2013.01); *H04S 7/30* (2013.01); *H04S 2400/03* (2013.01); *H04S 2400/11* (2013.01); *H04S 2420/03* (2013.01)

(58) Field of Classification Search

USPC ........................................................... 381/22

See application file for complete search history.

(56) References Cited

U.S. PATENT DOCUMENTS

| | | | |
|---|---|---|---|
| 7,680,288 | B2 | 3/2010 | Melchior |
| 7,756,713 | B2 | 7/2010 | Chong |
| 8,135,066 | B2 | 3/2012 | Harrison |
| 8,139,773 | B2 | 3/2012 | Oh |
| 8,175,280 | B2 | 5/2012 | Villemoes |
| 8,175,295 | B2 | 5/2012 | Oh |
| 8,194,861 | B2 | 6/2012 | Henn |
| 8,195,318 | B2 | 6/2012 | Oh |
| 8,204,756 | B2 | 6/2012 | Kim et al. |
| 8,223,976 | B2 | 7/2012 | Purnhagen |
| 8,234,122 | B2 | 7/2012 | Kim |
| 8,271,290 | B2 | 9/2012 | Breebaat |
| 8,296,158 | B2 | 10/2012 | Kim |
| 8,315,396 | B2 | 11/2012 | Schreiner |
| 8,364,497 | B2 | 1/2013 | Beack |
| 8,379,868 | B2 | 2/2013 | Goodwin et al. |
| 8,396,575 | B2 | 3/2013 | Kraemer |
| 8,407,060 | B2 | 3/2013 | Hellmuth |
| 8,417,531 | B2 | 4/2013 | Kim et al. |
| 8,620,465 | B2 | 12/2013 | Van Den Berghe et al. |
| 2005/0114121 | A1 | 5/2005 | Tsingos |
| 2005/0157883 | A1 | 7/2005 | Herre et al. |
| 2006/0072623 | A1 | 4/2006 | Park |
| 2009/0125313 | A1 | 5/2009 | Hellmuth |
| 2009/0210238 | A1 | 8/2009 | Kim |
| 2009/0220095 | A1 | 9/2009 | Oh |
| 2010/0017003 | A1 | 1/2010 | Oh |
| 2010/0076772 | A1 | 3/2010 | Kim |
| 2010/0189266 | A1 | 7/2010 | Oh |
| 2010/0191354 | A1 | 7/2010 | Oh |
| 2010/0284549 | A1 | 11/2010 | Oh |
| 2011/0013790 | A1 | 1/2011 | Hilpert et al. |
| 2011/0022206 | A1 | 1/2011 | Scharrer |
| 2011/0022402 | A1* | 1/2011 | Engdegard ............ G10L 19/008 704/E19.001 |
| 2011/0081023 | A1 | 4/2011 | Raghuvanshi |
| 2011/0112669 | A1 | 5/2011 | Scharrer |
| 2011/0182432 | A1 | 7/2011 | Ishikawa |
| 2012/0076204 | A1 | 3/2012 | Raveendran |
| 2012/0143613 | A1 | 6/2012 | Herre |
| 2012/0177204 | A1 | 7/2012 | Hellmuth |
| 2012/0182385 | A1 | 7/2012 | Kanamori |
| 2012/0183148 | A1 | 7/2012 | Cho |
| 2012/0213376 | A1 | 8/2012 | Hellmuth et al. |
| 2012/0232910 | A1 | 9/2012 | Dressler |
| 2012/0243690 | A1 | 9/2012 | Engdegard |
| 2012/0259643 | A1 | 10/2012 | Engdegard et al. |
| 2012/0263308 | A1 | 10/2012 | Herre |
| 2012/0269353 | A1 | 10/2012 | Herre |
| 2012/0275609 | A1 | 11/2012 | Beack |
| 2013/0028426 | A1 | 1/2013 | Purnhagen |
| 2014/0023196 | A1 | 1/2014 | Xiang |
| 2014/0025386 | A1 | 1/2014 | Xiang |
| 2016/0125888 | A1 | 5/2016 | Purnhagen et al. |

FOREIGN PATENT DOCUMENTS

| | | | | |
|---|---|---|---|---|
| CN | 101981617 | | 2/2011 | |
| CN | 102595303 | | 7/2012 | |
| CN | 103109549 | | 5/2013 | |
| EP | 2273492 | | 1/2011 | |
| GB | 2485979 | | 6/2012 | |
| KR | 20070037985 | A * | 4/2007 | ........... G10L 19/008 |
| RS | 1332 | U | 8/2013 | |
| RU | 2406164 | | 12/2010 | |
| RU | 2430430 | | 9/2011 | |
| RU | 2452043 | | 5/2012 | |
| WO | 2008/046530 | | 4/2008 | |
| WO | 2008/069593 | | 6/2008 | |
| WO | 2008/100100 | | 8/2008 | |
| WO | 2009/049895 | | 4/2009 | |
| WO | 2010/125104 | | 11/2010 | |
| WO | 2011/039195 | | 4/2011 | |
| WO | 2011/102967 | | 8/2011 | |
| WO | 2012/125855 | | 9/2012 | |
| WO | 2013/142657 | | 9/2013 | |
| WO | 2014/015299 | | 1/2014 | |
| WO | 2014/025752 | | 2/2014 | |
| WO | 2014/099285 | | 6/2014 | |
| WO | 2014/161993 | | 10/2014 | |
| WO | 2014/187986 | | 11/2014 | |
| WO | 2014/187988 | | 11/2014 | |
| WO | 2014/187989 | | 11/2014 | |

OTHER PUBLICATIONS

Capobianco, J. et al "Dynamic Strategy for Window Splitting, Parameters Estimation and Interpolation in Spatial Parametric Audio Coders" IEEE International Conference on Acoustics, Speech and Signal Processing, Mar. 25-30, 2012, pp. 397-400.

Dolby Atmos Next-Generation Audio for Cinema, Apr. 1, 2012 (available at http://www.dolby.com/us/en/professional/cinema/products/dolby-atmos-next-- generation-audio-for-cinema-white-paper.pdf. cited by applicant.

Engdegard J. et al "Spatial Audio Object Coding (SAOC)—The upcoming MPEG Standard on Parametric Object Based Audio Coding" Journal of the Audio Engineering Society, New York, US, May 17, 2008, pp. 1-16.

Engdegard, J. et al "Spatial Audio Object Coding (SAOC)—The Upcoming MPEG Standard on Parametric Object Based Audio Coding" AES presented at the 124th Convention, May 17-20, 2008, Amsterdam,pp. 1-15.

Falch, C. et al "Spatial Audio Object Coding with Enhanced Audio Object Separation" Proc. of the 13th Int. Conference on Digital Audio Effects,(DAFx-10) Graz, Austria, Sep. 6-10, 2010, pp. 1-10.

(56) References Cited

OTHER PUBLICATIONS

Gorlow, S. et al "Informed Audio Source Separation Using Linearly Constrained Spatial Filters" IEEE Transactions on Audio, Speech and Language Processing, New York, USA, vol. 21, No. 1, Jan. 1, 2013, pp. 3-13.

Herre, J. et al "The Reference Model Architecture for MPEG Spatial Audio Coding" AES convention presented at the 118th Convention, Barcelona, Spain, May 28-31, 2005.

Innami, S. et al "On-Demand Soundscape Generation Using Spatial Audio Mixing" IEEE International Conference on Consumer Electronics, Jan. 9-12, 2011, pp. 29-30.

Innami, S. et al "Super-Realistic Environmental Sound Synthesizer for Location-Based Sound Search System" IEEE Transactions on Consumer Electronics, vol. 57, Issue 4, pp. 1891-1898, Nov. 2011.

ISO/IEC FDIS 23003-2:2010 Information Technology—MPEG Audio Technologies—Part 2: Spatial Audio Object Coding (SAOC) ISO/IEC JTC 1/SC 29/WG 11, Mar. 10, 2010.

Jang, Dae-Young, et al "Object-Based 3D Audio Scene Representation" Audio Engineering Society Convention 115, Oct. 10-13, 2003, pp. 1-6.

Schuijers, E. et al "Low Complexity Parametric Stereo Coding in MPEG-4" AES Convention, paper No. 6073, May 2004.

Stanojevic, T. "Some Technical Possibilities of Using the Total Surround Sound Concept in the Motion Picture Technology", 133rd SMPTE Technical Conference and Equipment Exhibit, Los Angeles Convention Center, Los Angeles, California, Oct. 26-29, 1991.

Stanojevic, T. et al "Designing of TSS Halls" 13th International Congress on Acoustics, Yugoslavia, 1989.

Stanojevic, T. et al "The Total Surround Sound (TSS) Processor" SMPTE Journal, Nov. 1994.

Stanojevic, T. et al "The Total Surround Sound System", 86th AES Convention, Hamburg, Mar. 7-10, 1989.

Stanojevic, T. et al "TSS System and Live Performance Sound" 88th AES Convention, Montreux, Mar. 13-16, 1990.

Stanojevic, T. et al. "TSS Processor" 135th SMPTE Technical Conference, Oct. 29-Nov. 2, 1993, Los Angeles Convention Center, Los Angeles, California, Society of Motion Picture and Television Engineers.

Stanojevic, Tomislav "3-D Sound in Future HDTV Projection Systems" presented at the 132nd SMPTE Technical Conference, Jacob K. Javits Convention Center, New York City, Oct. 13-17, 1990.

Stanojevic, Tomislav "Surround Sound for a New Generation of Theaters, Sound and Video Contractor" Dec. 20, 1995.

Stanojevic, Tomislav, "Virtual Sound Sources in the Total Surround Sound System" Proc. 137th SMPTE Technical Conference and World Media Expo, Sep. 6-9, 1995, New Orleans Convention Center, New Orleans, Louisiana.

Tsingos, N. et al "Perceptual Audio Rendering of Complex Virtual Environments" ACM Transactions on Graphics, vol. 23, No. 3, Aug. 1, 2004, pp. 249-258.

* cited by examiner

RECONSTRUCTION OF AUDIO SCENES FROM A DOWNMIX

CROSS-REFERENCE TO RELATED APPLICATIONS

This application is a continuation of allowed U.S. application Ser. No. 17/219,911, filed Apr. 1, 2021, which is a divisional of U.S. application Ser. No. 16/380,879 filed Apr. 10, 2019, now U.S. Pat. No. 10,971,163 issued on Apr. 6, 2021, which is a continuation of U.S. application Ser. No. 15/584,553 filed May 2, 2017, now U.S. Pat. No. 10,290,304 issued on May 14, 2019, which is a continuation of U.S. patent application Ser. No. 14/893,377 filed Nov. 23, 2015, now U.S. Pat. No. 9,666,198 issued on May 30, 2017, which is a U.S. 371 National Phase entry from PCT/EP2014/060732 filed May 23, 2014, which claims priority to U.S. Provisional Patent Application No. 61/827,469 filed May 24, 2013, which are all hereby incorporated by reference in their entirety.

TECHNICAL FIELD

The invention disclosed herein generally relates to the field of encoding and decoding of audio. In particular it relates to encoding and decoding of an audio scene comprising audio objects.

The present disclosure is related to U.S. Provisional application No. 61/827,246 filed on the same date as the present application, entitled "Coding of Audio Scenes", and naming Heiko Purnhagen et al., as inventors is hereby included by reference in its entirety.

BACKGROUND

There exist audio coding systems for parametric spatial audio coding. For example, MPEG Surround describes a system for parametric spatial coding of multichannel audio. MPEG SAOC (Spatial Audio Object Coding) describes a system for parametric coding of audio objects.

On an encoder side these systems typically downmix the channels/objects into a downmix, which typically is a mono (one channel) or a stereo (two channels) downmix, and extract side information describing the properties of the channels/objects by means of parameters like level differences and cross-correlation. The downmix and the side information are then encoded and sent to a decoder side. At the decoder side, the channels/objects are reconstructed, i.e. approximated, from the downmix under control of the parameters of the side information.

A drawback of these systems is that the reconstruction is typically mathematically complex and often has to rely on assumptions about properties of the audio content that is not explicitly described by the parameters sent as side information. Such assumptions may for example be that the channels/objects are treated as uncorrelated unless a cross-correlation parameter is sent, or that the downmix of the channels/objects is generated in a specific way.

In addition to the above, coding efficiency emerges as a key design factor in applications intended for audio distribution, including both network broadcasting and one-to-one file transmission. Coding efficiency is of some relevance also to keep file sizes and required memory limited, at least in non-professional products.

BRIEF DESCRIPTION OF THE DRAWINGS

In what follows, example embodiments will be described with reference to the accompanying drawings, on which.

All the figures are schematic and generally show parts to elucidate the subject matter herein, whereas other parts may be omitted or merely suggested. Unless otherwise indicated, like reference numerals refer to like parts in different figures.

DETAILED DESCRIPTION

Figure 1:
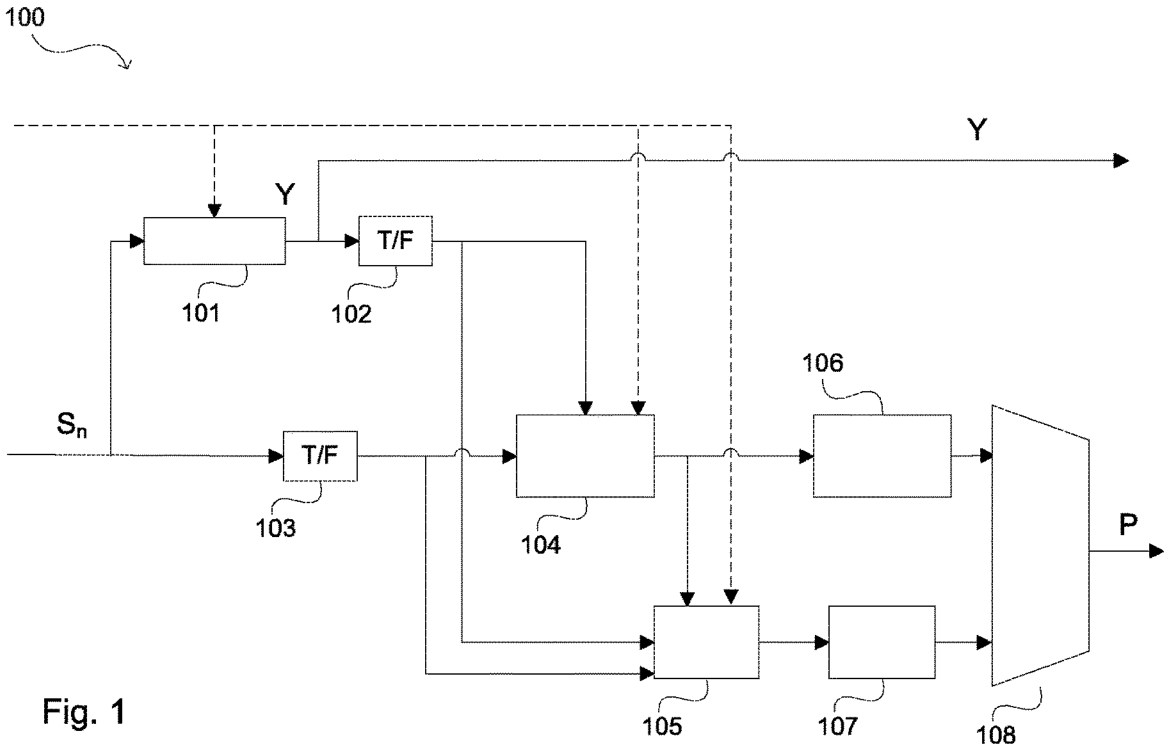
FIG. 1 is a generalized block diagram of an audio encoding system receiving an audio scene with a plurality of audio objects (and possibly bed channels as well) and outputting a downmix bitstream and a metadata bitstream.

As used herein, an audio signal may refer to a pure audio signal, an audio part of a video signal or multimedia signal, or an audio signal part of a complex audio object, wherein an audio object may further comprise or be associated with positional or other metadata. The present disclosure is generally concerned with methods and devices for converting from an audio scene into a bitstream encoding the audio scene (encoding) and back (decoding or reconstruction). The conversions are typically combined with distribution, whereby decoding takes place at a later point in time than encoding and/or in a different spatial location and/or using different equipment. In the audio scene to be encoded, there is at least one audio object. The audio scene may be considered segmented into frequency bands (e.g., B=11 frequency bands, each of which includes a plurality of frequency samples) and time frames (including, say, 64 samples), whereby one frequency band of one time frame forms a time/frequency tile. A number of time frames, e.g., 24 time frames, may constitute a super frame. A typical way to implement such time and frequency segmentation is by windowed time-frequency analysis (example window length: 640 samples), including well-known discrete harmonic transforms.

I. Overview—Coding by Object Gains

In an example embodiment within a first aspect, there is provided a method for encoding an audio scene whereby a bitstream is obtained. The bitstream may be partitioned into a downmix bitstream and a metadata bitstream. In this example embodiment, signal content in several (or all) frequency bands in one time frame is encoded by a joint processing operation, wherein intermediate results from one processing step are used in subsequent steps affecting more than one frequency band.

The audio scene comprises a plurality of audio objects. Each audio object is associated with positional metadata. A downmix signal is generated by forming, for each of a total of M downmix channels, a linear combination of one or more of the audio objects. The downmix channels are associated with respective positional locators.

For each audio object, the positional metadata associated with the audio object and the spatial locators associated with some or all the downmix channels are used to compute correlation coefficients. The correlation coefficients may coincide with the coefficients which are used in the downmixing operation where the linear combinations in the downmix channels are formed; alternatively, the downmixing operation uses an independent set of coefficients. By collecting all non-zero correlation coefficients relating to the audio object, it is possible to upmix the downmix signal, e.g., as the inner product of a vector of the correlation coefficients and the M downmix channels. In each frequency band, the upmix thus obtained is adjusted by a frequency-dependent object gain, which preferably can be assigned different values with a resolution of one frequency band. This is accomplished by assigning a value to the object gain in such manner that the upmix of the downmix signal rescaled by the gain approximates the audio object in that frequency band; hence, even if the correlation coefficients are used to control the downmixing operation, the object gain may differ between frequency band to improve the fidelity of the encoding. This may be accomplished by comparing the audio object and the upmix of the downmix signal in each frequency band and assigning a value to the object gain that provides a faithful approximation. The bitstream resulting from the above encoding method encodes at least the downmix signal, the positional metadata and the object gains.

The method according to the above example embodiment is able to encode a complex audio scene with a limited amount of data, and is therefore advantageous in applications where efficient, particularly bandwidth-economical, distribution formats are desired.

The method according to the above example embodiment preferably omits the correlation coefficients from the bitstream. Instead, it is understood that the correlation coefficients are computed on the decoder side, on the basis of the positional metadata in the bitstreams and the positional locators of the downmix channels, which may be predefined.

In an example embodiment, the correlation coefficients are computed in accordance with a predefined rule. The rule may be a deterministic algorithm defining how positional metadata (of audio objects) and positional locators (of downmix channels) are processed to obtain the correlation coefficients. Instructions specifying relevant aspects of the algorithm and/or implementing the algorithm in processing equipment may be stored in an encoder system or other entity performing the audio scene encoding. It is advantageous to store an identical or equivalent copy of the rule on the decoder side, so that the rule can be omitted from the bitstream to be transmitted from the encoder to the decoder side.

In a further development of the preceding example embodiment, the correlation coefficients may be computed on the basis of the geometric positions of the audio objects, in particular their geometric positions relative to the audio objects. The computation may take into account the Euclidean distance and/or the propagation angle. In particular, the correlation coefficients may be computed on the basis of an energy preserving panning law (or pan law), such as the sine-cosine panning law. Panning laws and particularly stereo panning laws, are well known in the art, where they are used for source positioning. Panning laws notably include assumptions on the conditions for preserving constant power or apparent constant power, so that the loudness (or perceived auditory level) can be kept the same or approximately so when an audio object changes its position.

In an example embodiment, the correlation coefficients are computed by a model or algorithm using only inputs that are constant with respect to frequency. For instance, the model or algorithm may compute the correlation coefficients based on the spatial metadata and the spatial locators only. Hence, the correlation coefficients will be constant with respect to frequency in each time frame. If frequency-dependent object gains are used, however, it is possible to correct the upmix of the downmix channels at frequency-band resolution so that the upmix of the downmix channels approximates the audio object as faithfully as possible in each frequency band.

In an example embodiment, the encoding method determines the object gain for at least one audio object by an analysis-by-synthesis approach. More precisely, it includes encoding and decoding the downmix signal, whereby a modified version of the downmix signal is obtained. An encoded version of the downmix signal may already be prepared for the purpose of being included in the bitstream forming the final result of the encoding. In audio distribution systems or audio distribution methods including both encoding of an audio scene as a bitstream and decoding of the bitstream as an audio scene, the decoding of the encoded downmix signal is preferably identical or equivalent to the corresponding processing on the decoder side. In these circumstances, the object gain may be determined in order to rescale the upmix of the reconstructed downmix channels (e.g., an inner product of the correlation coefficients and a decoded encoded downmix signal) so that it faithfully approximates the audio object in the time frame. This makes it possible to assign values to the object gains that reduce the effect of coding-induced distortion.

In an example embodiment, an audio encoding system comprising at least a downmixer, a downmix encoder, an upmix coefficient analyzer and a metadata encoder is provided. The audio encoding system is configured to encode an audio scene so that a bitstream is obtained, as explained in the preceding paragraphs.

In an example embodiment, there is provided a method for reconstructing an audio scene with audio objects based on a bitstream containing a downmix signal and, for each audio object, an object gain and positional metadata associated with the audio object. According to the method, correlation coefficients—which may be said to quantify the spatial relatedness of the audio object and each downmix channel—are computed based on the positional metadata and the spatial locators of the downmix channels. As discussed and exemplified above, it is advantageous to compute the correlation coefficients in accordance with a predetermined rule, preferably in a uniform manner on the encoder and decoder side. Likewise, it is advantageous to store the spatial locators of the downmix channels on the decoder side rather than transmitting them in the bitstream. Once the correlation coefficients have been computed, the audio object is reconstructed as an upmix of the downmix signal in accordance with the correlation coefficients (e.g., an inner product of the correlation coefficients and the downmix signal) which is rescaled by the object gain. The audio objects may then optionally be rendered for playback in multi-channel playback equipment.

Alone, the decoding method according to this example embodiment realizes an efficient decoding process for faithful audio scene reconstruction based on a limited amount of input data. Together with the encoding method previously discussed, it can be used to define an efficient distribution format for audio data.

In an example embodiment, the correlation coefficients are computed on the basis only of quantities without frequency variation in a single time frame (e.g., positional metadata of audio objects). Hence, each correlation coefficient will be constant with respect to frequency. Frequency variations in the encoded audio object can be captured by the use of frequency-dependent object gains.

In an example embodiment, an audio decoding system comprising at least a metadata decoder, a downmix decoder, an upmix coefficient decoder and an upmixer is provided. The audio decoding system is configured to reconstruct an audio scene on the basis of a bitstream, as explained in the preceding paragraphs.

Further example embodiments include: a computer program for performing an encoding or decoding method as described in the preceding paragraphs; a computer program product comprising a computer-readable medium storing computer-readable instructions for causing a programmable processor to perform an encoding or decoding method as described in the preceding paragraphs; a computer-readable medium storing a bitstream obtainable by an encoding method as described in the preceding paragraphs; a computer-readable medium storing a bitstream, based on which an audio scene can be reconstructed in accordance with a decoding method as described in the preceding paragraphs. It is noted that also features recited in mutually different claims can be combined to advantage unless otherwise stated.

II. Overview—Coding of Bed Channels

In an example embodiment within a second aspect, there is provided a method for reconstructing an audio scene on the basis of a bitstream comprising at least a downmix signal with M downmix channels. Downmix channels are associated with positional locators, e.g., virtual positions or directions of preferred channel playback sources. In the audio scene, there is at least one audio object and at least one bed channel. Each audio object is associated with positional metadata, indicating a fixed (for a stationary audio object) or momentary (for a moving audio object) virtual position. A bed channel, in contrast, is associated with one of the downmix channels and may be treated as positionally related to that downmix channel, which will from time to time be referred to as a corresponding downmix channel in what follows. For practical purposes, it may therefore be considered that a bed channel is rendered most faithfully where the positional locator indicates, namely, at the preferred location of a playback source (e.g., loudspeaker) for a downmix channel. As a further practical consequence, there is no particular advantage in defining more bed channels than there are available downmix channels. In summary, the position of an audio object can be defined and possibly modified over time by way of the positional metadata, whereas the position of a bed channel is tied to the corresponding bed channel and thus constant over time.

It is assumed in this example embodiment that each channel in the downmix signal in the bitstream comprises a linear combination of one or more of the audio object(s) and the bed channel(s), wherein the linear combination has been computed in accordance with downmix coefficients. The bitstream forming the input of the present decoding method comprises, in addition to the downmix signal, either the positional metadata associated with the audio objects (the decoding method can be completed without knowledge of the downmix coefficients) or the downmix coefficients controlling the downmixing operation. To reconstruct a bed channel on the basis of its corresponding downmix channel, said positional metadata (or downmix coefficients) are used in order to suppress that content in the corresponding downmix channel which represents audio objects. After suppression, the downmix channel contains bed channel content only, or is at least dominated by bed channel content. Optionally, after these processing steps, the audio objects may be reconstructed and rendered, along with the bed channels, for playback in multi-channel playback equipment.

Alone, the decoding method according to this example embodiment realizes an efficient decoding process for faithful audio scene reconstruction based on a limited amount of input data. Together with the encoding method to be discussed below, it can be used to define an efficient distribution format for audio data.

In various example embodiments, the object-related content to be suppressed is reconstructed explicitly, so that it would be renderable for playback. Alternatively, the object-related content is obtained by a process designed to return an incomplete representation estimation which is deemed sufficient in order to perform the suppression. The latter may be the case where the corresponding downmix channel is dominated by bed channel content, so that the suppression of the object-related content represents a relatively minor modification. In the case of explicit reconstruction, one or more of the following approaches may be adopted:

a) auxiliary signals capturing at least some of the N audio objects are received at the decoding end, as described in detail in the related U.S. provisional application (titled "Coding of Audio Scenes") initially referenced, which auxiliary signals can then be suppressed from the corresponding downmix channel;
b) a reconstruction matrix is received at the decoding end, as described in detail in the related U.S. provisional application (titled "Coding of Audio Scenes") initially referenced, which matrix permits reconstruction of the N audio objects from the M downmix signals, while possibly relying on auxiliary channels as well;
c) the decoding end receives object gains for reconstructing the audio objects based on the downmix signal, as described in this disclosure under the first aspect. The gains can be used together with downmix coefficients extracted from the bitstream, or together with downmix coefficients that are computed on the basis of the positional locators of the downmix channels and the positional metadata associated with the audio objects.

Various example embodiments may involve suppression of object-related content to different extents. One option is to suppress as much object-related content as possible, preferably all object-related content. Another option is to suppress a subset of the total object-related content, e.g., by an incomplete suppression operation, or by a suppression operation restricted to suppressing content that represents fewer than the full number of audio objects contributing to the corresponding downmix channel. If fewer audio objects than the full number are (attempted to be) suppressed, these may in particular be selected according to their energy content. Specifically, the decoding method may order the objects according to decreasing energy content and select so many of the strongest objects for suppression that a threshold value on the energy of the remaining object-related content is met; the threshold may be a fixed maximal energy of the object-related content or may be expressed as a percentage of the energy of the corresponding downmix channel after suppression has been performed. A still further option is to take the effect of auditory masking into account. Such an approach may include suppression of the perceptually dominating audio objects whereas content emanating from less noticeable audio objects—in particular audio objects that are masked by other audio objects in the signal—may be left in the downmix channel without inconvenience.

In an example embodiment, the suppression of the object-related content from the downmix channel is accompanied—preferably preceded—by a computation (or estimation) of the downmix coefficients that were applied to the audio objects when the downmix signal—in particular the corresponding downmix channel—was generated. The computation is based on the positional metadata, which are associated with the objects and received in the bitstream, and further on the positional locator of the corresponding downmix channel. (It is noted that in this second aspect, unlike the first aspect, it is assumed that the downmix coefficients that controlled the downmixing operation on the encoder side are obtainable once the positional locators of the downmix channels and the positional metadata of the audio objects are known.) If the downmix coefficients were received as part of the bitstream, there is clearly no need to compute the downmix coefficients in this manner. Next, the energy of the contribution of the audio objects to the corresponding downmix channel, or at least the energy of the contribution of a subset of the audio objects to the corresponding downmix channel, is computed based on the reconstructed audio objects or based on the downmix coefficients and the downmix signal. The energy is estimated by considering the audio objects jointly, so that the effect of statistical correlation (generally a decrease) is captured. Alternatively, if in a given use case it is reasonable to assume that the audio objects are substantially uncorrelated or approximately uncorrelated, the energy of each audio object is estimated separately. The energy estimation may either proceed indirectly, based on the downmix channels and the downmix coefficients together, or directly, by first reconstructing the audio objects. A further way in which the energy of each object could be obtained is as part of the incoming bitstream. After this stage, there is available, for each bed channel, an estimated energy of at least one of those audio objects that provide a non-zero contribution to the corresponding downmix channel, or an estimate of the total energy of two or more contributing audio objects considered jointly. The energy of the corresponding downmix channel is estimated as well. The bed channel is then reconstructed by filtering the corresponding downmix channel, with the estimated energy of at least one audio object as further inputs.

In an example embodiment, the computation of the downmix coefficients referred to above preferably follows a predefined rule applied in a uniform fashion on the encoder and decoder side. The rule may be a deterministic algorithm defining how positional metadata (of audio objects) and positional locators (of downmix channels) are processed to obtain the downmix coefficients. Instructions specifying relevant aspects of the algorithm and/or implementing the algorithm in processing equipment may be stored in an encoder system or other entity performing the audio scene encoding. It is advantageous to store an identical or equivalent copy of the rule on the decoder side, so that the rule can be omitted from the bitstream to be transmitted from the encoder to the decoder side.

In a further development of the preceding example embodiment, the downmix coefficients are computed on the basis of the geometric positions of the audio objects, in particular their geometric positions relative to the audio objects. The computation may take into account the Euclidean distance and/or the propagation angle. In particular, the downmix coefficients may be computed on the basis of an energy preserving panning law (or pan law), such as the sine-cosine panning law. As mentioned above, panning laws and stereo panning laws in particular, are well known in the art, where they are used, inter alia, for source positioning. Panning laws notably include assumptions on the conditions for preserving constant power or apparent constant power, so that the perceived auditory level remains the same when an audio object changes its position.

In an example embodiment, the suppression of the object-related content from the downmix channel is preceded by a computation (or estimation) of the downmix coefficients that were applied to the audio objects when the downmix signal—and the corresponding downmix channel in particular—was generated. The computation is based on the positional metadata, which are associated with the objects and received in the bitstream, and further on the positional locator of the corresponding downmix channel. If the downmix coefficients were received as part of the bitstream, there is clearly no need to compute the downmix coefficients in this manner. Next, the audio objects—or at least each audio object that provides a non-zero contribution to the downmix channels associated with the relevant bed channels to be reconstructed—are reconstructed and their energies are computed. After this stage, there is available, for each bed channel, the energy of each contributing audio object as well as the corresponding downmix channel itself. The energy of the corresponding downmix channel is estimated. The bed channel is then reconstructed by rescaling the corresponding downmix channel, namely by applying a scaling factor which is based on the energies of the audio objects, the energy of the corresponding downmix channel and the downmix coefficients controlling contributions from the audio objects to the corresponding downmix channel. The following is an example way of computing the scaling factor $h_n$ on the basis of the energy ($E[Y_n]$) of the corresponding downmix channel, the energy ($E[S_n^2]$, $n=N_B+1, \ldots, N$) of each audio object and the downmix coefficients ($d_{n, N_B+1}, \ldots, d_{n, N_B+2}, d_{n, N}$) applied to the audio objects:

$$h_n = \left( \max\left\{ \varepsilon, 1 - \frac{\Sigma_{n=N_B+1}^{N} d_{m,n}^2 E\left[S_n^2\right]}{E\left[Y_n^2\right]} \right\} \right)^{\gamma}$$

Here, $\varepsilon \geq 0$ and $\gamma \in [0.5, 1]$ are constants. Preferably, $\varepsilon=0$ and $\gamma=0.5$. In different example embodiments, the energies may be computed for different sections of the respective signals. Basically, the time resolution of the energies may be one time frame or a fraction (subdivision) of a time frame. The energies may refer to a particular frequency band or collection of frequency bands, or the entire frequency range, i.e., the total energy for all frequency bands. As such, the scaling factor $h_n$ may have one value per time frame (i.e., may be a broadband quantity, cf. FIG. 2A), or one value per time/ frequency tile (cf. FIG. 2B) or more than one value per time frame, or more than one value per time/frequency tile (cf. FIG. 2C). It may be advantageous to use a finer granularity (increasing the number of independent values per unit time) for bed channel reconstruction than for audio object reconstruction, wherein the latter may be performed on the basis of object gains assuming one value per time/frequency tile, see above under the first aspect. Similarly, the positional metadata have a granularity of one time frame, i.e., the duration of one time/frequency tile. One such advantage is the improved ability to handle transient signal content, particularly if the relationship between audio objects and bed channels is changing on a short time scale.

In an example embodiment, the object-related content is suppressed by signal subtraction in the time domain or the frequency domain. Such signal subtraction may be a constant-gain subtraction of the waveform of each audio object from the waveform of the corresponding downmix channel; alternatively, the signal subtraction amounts to subtracting transform coefficients of each audio object from corresponding transform coefficients of the corresponding downmix channel, again with constant gain in each time/frequency tile. Other example embodiments may instead rely on a spectral suppression technique, wherein the energy spectrum (or magnitude spectrum) of the bed channel is substantially equal to the difference of the energy spectrum of the corresponding downmix channel and the energy spectrum of each audio object that is subject to the suppression. Put differently, a spectral suppression technique may leave the phase of the signal unchanged but attenuate its energy. In implementations acting on time-domain or frequency-domain representations of the signals, spectral suppression may require gains that are time- and/or frequency-dependent. Techniques for determining such variable gains are well known in the art and may be based on an estimated phase difference between the respective signals and similar considerations. It is noted that in the art, the term spectral subtraction is sometimes used as a synonym of spectral suppression in the above sense.

In an example embodiment, an audio decoding system comprising at least a downmix decoder, a metadata decoder and an upmixer is provided. The audio decoding system is configured to reconstruct an audio scene on the basis of a bitstream, as explained in the preceding paragraphs.

In an example embodiment, there is provided a method for encoding an audio scene, which comprises at least one audio object and at least one bed channel, as a bitstream that encodes a downmix signal and the positional metadata of the audio objects. In this example embodiment, it is preferred to encode at least one time/frequency tile at a time. The downmix signal is generated by forming, for each of a total of M downmix channels, a linear combination of one or more of the audio objects and any bed channel associated with the respective downmix channel. The linear combination is formed in accordance with downmix coefficients, wherein each such downmix coefficients that is to be applied to the audio objects is computed on the basis of a positional locator of a downmix channel and positional metadata associated with an audio object. The computation preferably follows a predefined rule, as discussed above.

It is understood that the output bitstream comprises data sufficient to reconstruct the audio objects at an accuracy deemed sufficient in the use case concerned, so that the audio objects may be suppressed from the corresponding bed channel. The reconstruction of the object-related content either is explicit, so that the audio objects would in principle be renderable for playback, or is done by an estimation process returning an incomplete representation sufficient to perform the suppression. Particularly advantageous approaches include:

a) including auxiliary signals, containing at least some of the N audio objects, in the bitstream;
b) including a reconstruction matrix, which permits reconstruction of the N audio objects from the M downmix signals (and optionally from the auxiliary signals as well), in the bitstream;
c) including object gains, as described in this disclosure under the first aspect, in the bitstream.

The method according to the above example embodiment is able to encode a complex audio scene—such as one including both positionable audio objects and static bed channels—with a limited amount of data, and is therefore advantageous in applications where efficient, particularly bandwidth-economical, distribution formats are desired.

In an example embodiment, an audio encoding system comprising at least a downmixer, a downmix encoder and a metadata encoder is provided. The audio encoding system is configured to encode an audio scene in such manner that a bitstream is obtained, as explained in the preceding paragraphs.

Further example embodiments include: a computer program for performing an encoding or decoding method as described in the preceding paragraphs; a computer program product comprising a computer-readable medium storing computer-readable instructions for causing a programmable processor to perform an encoding or decoding method as described in the preceding paragraphs; a computer-readable medium storing a bitstream obtainable by an encoding method as described in the preceding paragraphs; a computer-readable medium storing a bitstream, based on which an audio scene can be reconstructed in accordance with a decoding method as described in the preceding paragraphs. It is noted that also features recited in mutually different claims can be combined to advantage unless otherwise stated.

III. Example Embodiments

The technological context of the present invention can be understood more fully from the related U.S. provisional application (titled "Coding of Audio Scenes") initially referenced.

FIG. 1 schematically shows an audio encoding system 100, which receives as its input a plurality of audio signals $S_n$ representing audio objects (and bed channels, in some example embodiments) to be encoded and optionally rendering metadata (dashed line), which may include positional metadata. A downmixer 101 produces a downmix signal Y with M>1 downmix channels by forming linear combinations of the audio objects (and bed channels), $Y=\Sigma_{n=1}^{N} d_n S_n$, wherein the downmix coefficients applied may be variable and more precisely influenced by the rendering metadata. The downmix signal Y is encoded by a downmix encoder (not shown) and the encoded downmix signal $Y_c$ is included in an output bitstream from the encoding system 1. An encoding format suited for this type of applications is the Dolby Digital Plus™ (or Enhanced AC-3) format, notably its 5.1 mode, and the downmix encoder may be a Dolby Digital Plus™-enabled encoder. Parallel to this, the downmix signal Y is supplied to a time-frequency transform 102 (e.g., a QMF analysis bank), which outputs a frequency-domain representation of the downmix signal, which is then supplied to an up mix coefficient analyzer 104. The upmix coefficient analyzer 104 further receives a frequency-domain representation of the audio objects $S_n(k,l)$, where k is an index of a frequency sample (which is in turn included in one of B frequency bands) and l is the index of a time frame, which has been prepared by a further time-frequency transform 103 arranged upstream of the upmix coefficient analyzer 104. The upmix coefficient analyzer 104 determines upmix coefficients for reconstructing the audio objects on the basis of the downmix signal on the decoder side. Doing so, the upmix coefficient analyzer 104 may further take the rendering metadata into account, as the dashed incoming arrow indicates. The upmix coefficients are encoded by an upmix coefficient encoder 106. Parallel to this, the respective frequency-domain representations of the downmix signal Y and the audio objects are supplied, together with the upmix coefficients and possibly the rendering metadata, to a correlation analyzer 105, which estimates statistical quantities (e.g., cross-covariance $E[S_n(k,l)S_{n'}(k,l)]$, $n \neq n'$) which it is desired to preserve by taking appropriate correction measures at the decoder side. Results of the estimations in the correlation analyzer 105 are fed to a correlation data encoder 107 and combined with the encoded upmix coefficients, by a bitstream multiplexer 108, into a metadata bitstream P constituting one of the outputs of the encoding system 100.

Figure 4:
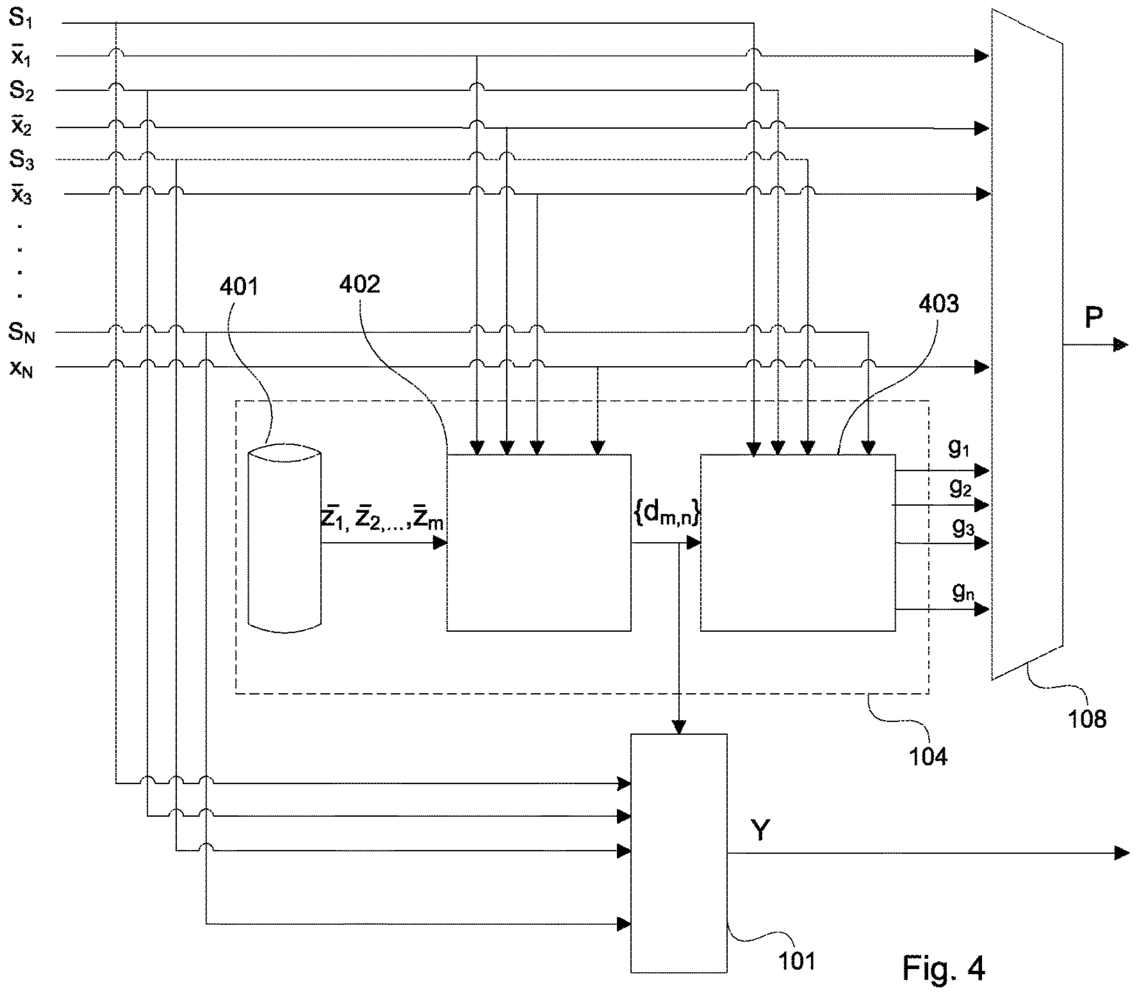
FIG. 4 shows a detail of an audio encoding system configured to code an audio object by an object gain.

FIG. 4 shows a detail of the audio encoding system 100, more precisely the inner workings of the upmix coefficients analyzer 104 and its relationship with the downmixer 101, in an example embodiment within the first aspect. In the example embodiment shown, the encoding system 100 receives N audio objects (and no bed channels), and encodes the N audio objects in terms of the downmix signal Y and, in a further bitstream P, spatial metadata $\vec{x}_n$ in associated with the audio objects and N object gains $g_n$. The upmix coefficients analyzer 104 includes a memory 401, which stores spatial locators $\vec{z}_m$ of the downmix channels, a downmix coefficient computation unit 402 and an object gain computation unit 403. The downmix coefficient computation unit 402 stores a predefined rule for computing the downmix coefficients (preferably producing the same result as a corresponding rule stored in an intended decoding system) on the basis of the spatial metadata $\vec{x}_n$, which the encoding system 100 receives as part of the rendering metadata, and the spatial locators $\vec{z}_m$. In normal circumstances, each of the downmix coefficients thus computed is a number less than or equal to one, $d_{m,n} \leq 1$, $m=1, \ldots,$ $n=1, \ldots, N$, or less than or equal to some other absolute constant. The downmix coefficients may also be computed subject to an energy conservation rule or panning rule, which implies a uniform upper bound on the vector $d_n=[d_{n,1}\ d_{n,2} \ldots d_{n,m}]^T$ applied to each given audio object $S_n$, such as $\|d_n\| \leq C$ uniformly for all $n=1, \ldots, N$, wherein normalization may ensure $\|d_n\|=C$. The downmix coefficients are supplied to both the downmixer 101 and the object gain computation unit 403. The output of the downmixer 101 may be written as the sum $Y=\Sigma_{l=1}^{N} d_l S_l$. In this example embodiment, the downmix coefficients are broadband quantities, whereas the object gains $g_n$ can be assigned an independent value for each frequency band. The object gain computation unit 403 compares each audio object $S_n$ with the estimate that will be obtained from the upmix at the decoder side, namely $$d_n^T Y = d_n^T \sum_{l=1}^{N} d_l S_l = \sum_{l=1}^{N} (d_n^T d_l) S_l.$$

Assuming $\|d_l\|=C$ for all $l=1, \ldots, N$, then $d_n^T d_l \leq C^2$ with equality for l=n, that is, the dominating coefficient will be the one multiplying $S_n$. The signal $d_n^T Y$ may however include contributions from the other audio objects as well, and the impact of these further contributions may be limited by an appropriate choice of the object gain $g^n$. More precisely, the object gain computation unit 403 assigns a value to the object gain $g^n$ such that $$S_n \approx g_n \left( C^2 S_n + \sum_{\substack{l=1 \\ l \neq n}}^{N} (d_n^T d_l) S_l \right)$$

in the time/frequency tile.

Figure 5:
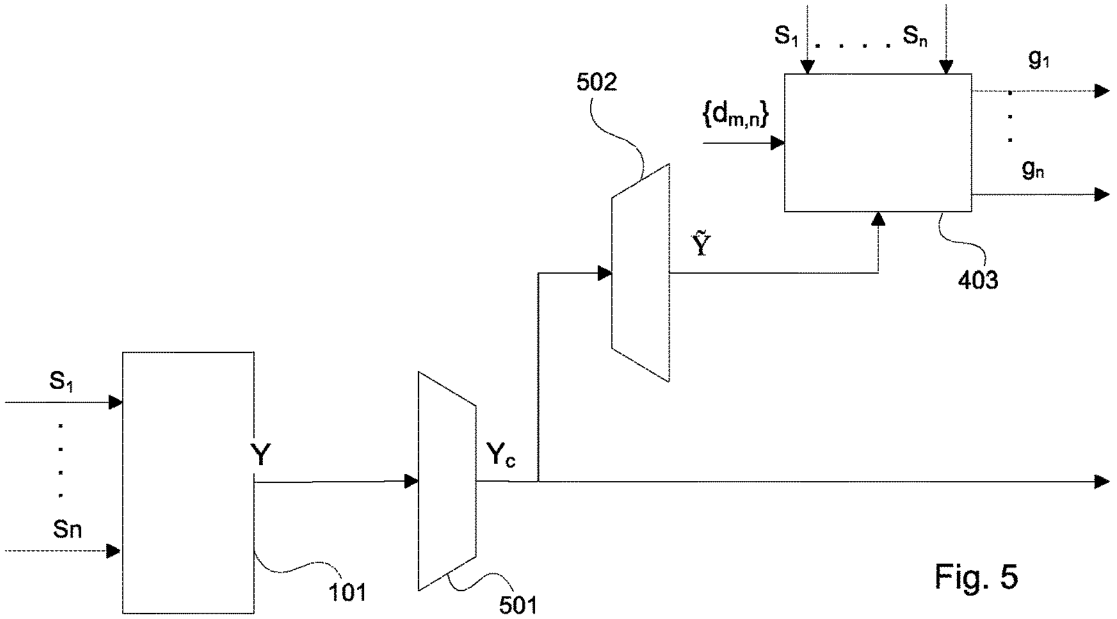
FIG. 5 shows a detail of an audio encoding system which computes said object gain while taking into account coding distortion.
Figure 6:
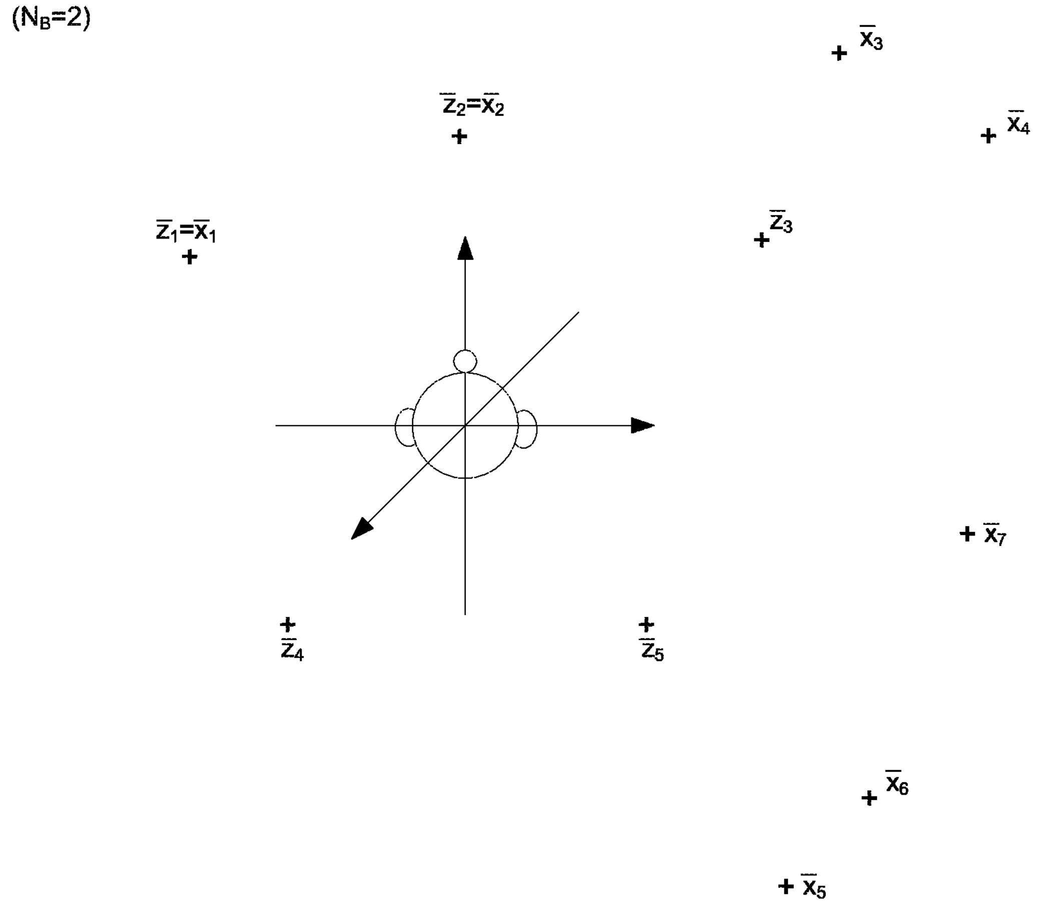
FIG. 6 shows example virtual positions of downmix channels ($\vec{z}_1, \ldots, \vec{z}_M$) bed channels ($\vec{x}_1, \ldots, \vec{x}_2$) and audio objects ($\vec{x}_3, \ldots, \vec{x}_7$) in relation to a reference listening point.

FIG. 5 shows a further development of the encoder system 100 of FIG. 4. Here, the object gain computation unit 403 (within the upmix coefficients analyzer 104) is configured to compute the object gains by comparing each audio objects $S_n$ not with an upmix $d_n^T Y$ of the downmix signal Y, but with an upmix $d_n^T \tilde{Y}$ of a restored downmix signal $\tilde{Y}$. The restored downmix signal is obtained by using the output of a downmix encoder 501, which receives the output from the downmixer 101 and prepares the bitstream with the encoded downmix signal. The output $Y_c$ of the downmix encoder 501 is supplied to a downmix decoder 502 mimicking the action of a corresponding downmix decoder on the decoding side. It is advantageous to use an encoder system according to FIG. 5 when the downmix decoder 501 performs lossy encoding, as such encoding will introduce coding noise (including quantization distortion), which can be compensated to some extent by the object gains $g_n$.

Figure 3:
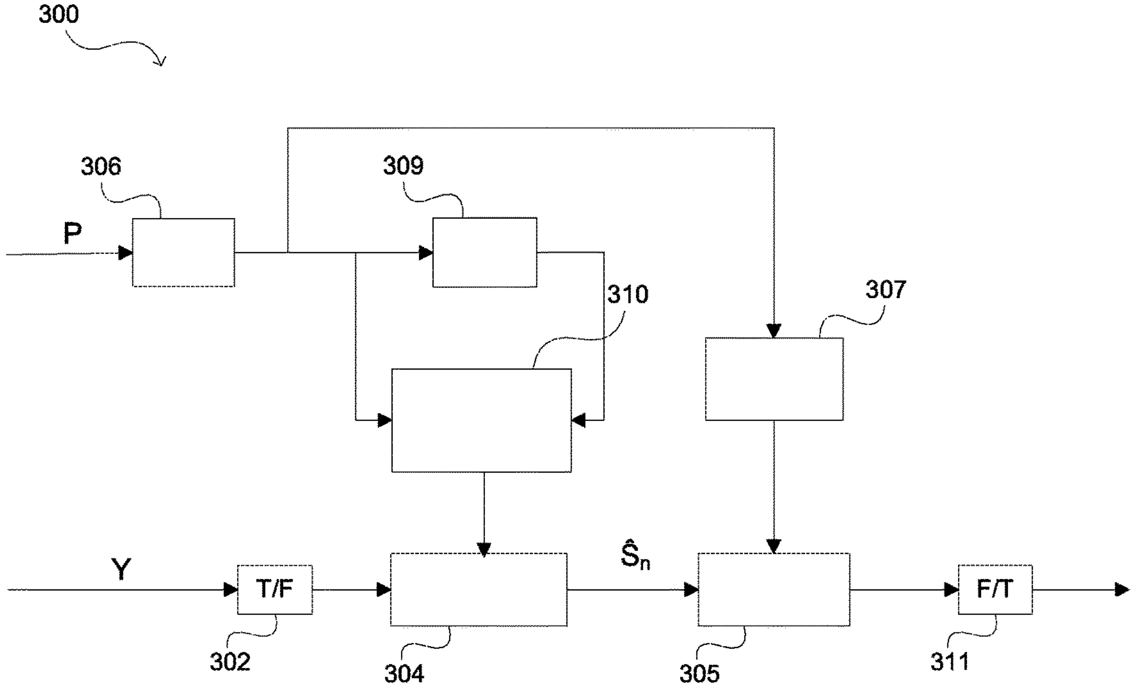
FIG. 3 is a generalized block diagram of an audio decoding system, which reconstructs an audio scene on the basis of a downmix bitstream and a metadata bitstream.

FIG. 3 schematically shows a decoding system 300 designed to cooperate, on a decoding side, with an encoding system of any of the types shown in FIG. 1, 4 or 5. The decoding system 300 receives a metadata bitstream P and a downmix bitstream Y. Based on the downmix bitstream Y, a time-frequency transform 302 (e.g., a QMF analysis bank) prepares a frequency-domain representation of the downmix signal and supplies this to an upmixer 304. The operations in the upmixer 304 are controlled by upmix coefficients, which it receives from a chain of metadata processing components. More precisely, an upmix coefficient decoder 306 decodes the metadata bitstream and supplies its output to an arrangement performing interpolation—and possibly transient control—of the upmix coefficients. In some example embodiments, values of the upmix coefficients are given at discrete points in time, and interpolation may be used to obtain values applying for intermediate points in time. The interpolation may be of a linear, quadratic, spline or higher-order type, depending on the requirements in a specific use case. Said interpolation arrangement comprises a buffer 309, configured to delay the received upmix coefficients by a suitable period of time, and an interpolator 310 for deriving the intermediate values based on a current and a previous given upmix coefficient value. Parallel to this, a correlation control data decoder 307 decodes the statistical quantities estimated by the correlation analyzer 105 and supplies the decoded data to an object correlation controller 305. To summarize, the downmix signal Y undergoes time-frequency transformation in the time-frequency transform 302, is upmixed into signals representing audio objects in the upmixer 304, which signals are then corrected so that the statistical characteristics—as measured by the quantities estimated by the correlation analyzer 105—are in agreement with those of the audio objects originally encoded. A frequency-time transform 311 provides the final output of the decoding system 300, namely, a time-domain representation of the decoded audio objects, which may then be rendered for playback.

Figure 7:
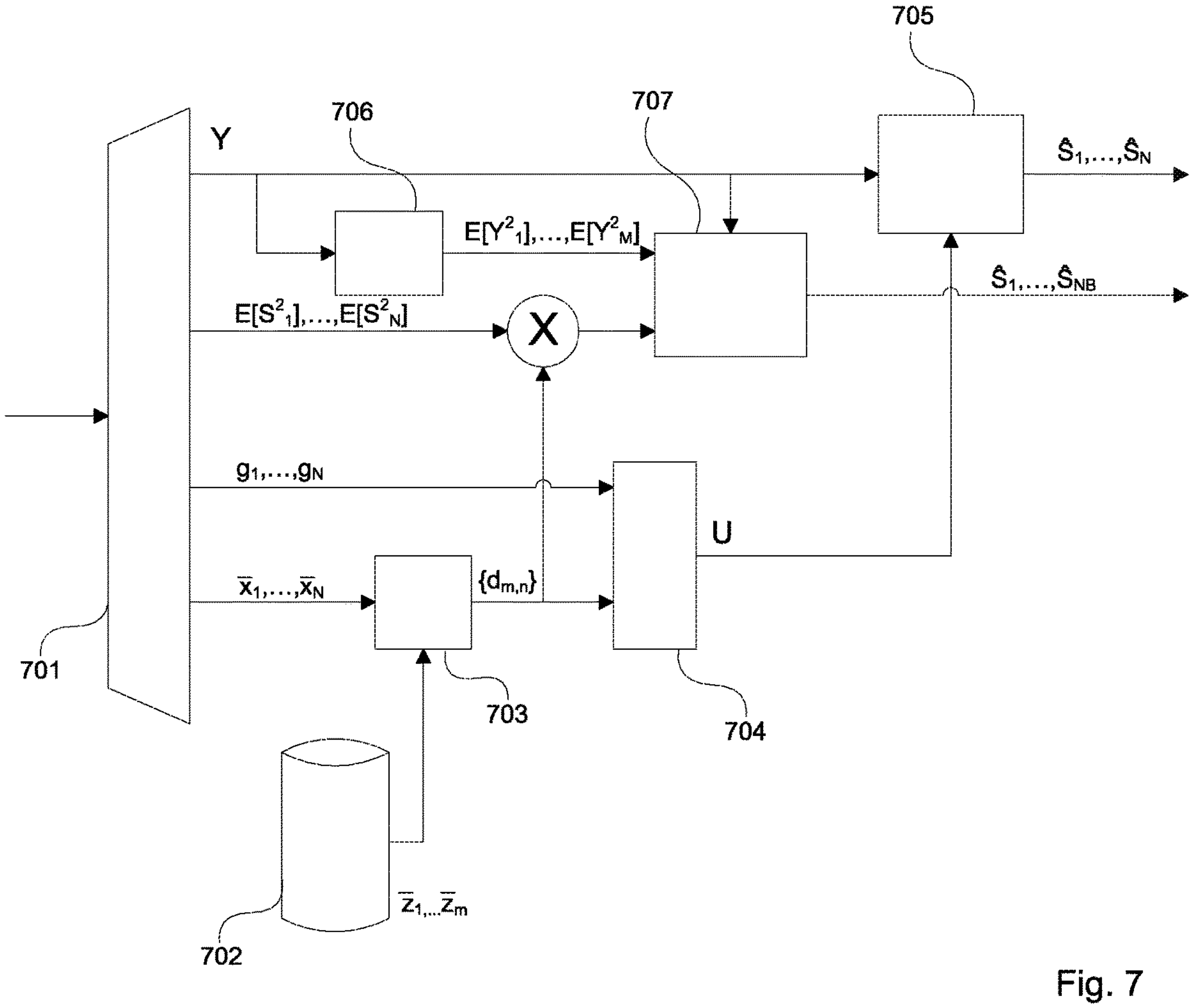
FIG. 7 illustrates an audio decoding system particularly configured for reconstructing a mix of bed channels and audio objects.

FIG. 7 shows a further development of the audio decoding system 300, notably with an ability to reconstruct an audio scene that includes bed channels $S_n$, n=1, . . . , $N_B$ in addition to audio objects $S_n$, n=$N_B$+1, . . . , N. From an incoming bitstream, a multiplexer 701 extracts and decodes: a downmix signal Y, energies of the audio objects $E[S_n^2]$, n=$N_B$+1, . . . , N, object gains associated with the audio objects $g_n$, n=$N_B$+1, . . . , N, and positional metadata $\vec{x}_n$, n=$N_B$+1, . . . , N, associated with the audio objects. The bed channels are reconstructed on the basis of their corresponding downmix channel signals by suppressing object-related content therein, in accordance with the second aspect, wherein the audio objects are reconstructed by upmixing the downmix signal using an upmix matrix U determined based on the object gains, according to the first aspect. A downmix coefficient reconstruction unit 703 uses positional locators $\vec{z}_m$, m=1, . . . M, of the downmix channels, the positional locators being retrieved from a connected memory 702, and the positional metadata to compute, according to a predefined rule, the restore the downmix coefficients $d_{m,n}$ used on the encoding side. The downmix coefficients computed by the downmix coefficient reconstruction unit 703 are used for two purposes. Firstly, they are multiplied row-wise by the object gains and arranged as an upmix matrix $$U = \begin{bmatrix} g_1 d_{1,1} & g_1 d_{2,1} & \cdots & g_1 d_{M,1} \\ g_2 d_{1,2} & g_2 d_{2,2} & \cdots & g_2 d_{M,2} \\ \vdots & \vdots & \ddots & \vdots \\ g_N d_{1,N} & g_N d_{2,N} & \cdots & g_N d_{M,N} \end{bmatrix},$$

which is then provided to an upmixer 705, which applies the elements of matrix U to the downmix channels to reconstruct the audio objects. Parallel to this, the downmix coefficients are supplied from the downmix coefficient reconstruction unit 703 to a Wiener filter 707 after being multiplied by the energies of the audio objects. Between the multiplexer 701 and a further input of the Wiener filter 707, there is provided an energy estimator 706 for computing the energy $E[Y_m^2]$, m=1, . . . , $N_B$ of each downmix channel that is associated with a bed channel. Based on this information, the Wiener filter 707 internally computes a scaling factor $$h_n = \left(\max\left\{\varepsilon, 1 - \frac{\sum_{n=N_B+1}^{N} d_{m,n}^2 E[S_n^2]}{E[Y_n^2]}\right\}\right)^{\gamma}, n = 1, \ldots, N_B,$$

with constant ε≥0 and 0.5≤γ≤1, and applies this to the corresponding downmix channel, so as to reconstruct the bed channel as $\hat{S}_n = h_n Y_n$, n=1, . . . , $N_B$. In summary, the decoding system shown in FIG. 7 outputs reconstructed signals corresponding to all audio objects and all bed channels, which may subsequently be rendered for playback in multichannel equipment. The rendering may additionally rely on the positional metadata associated with the audio objects and the positional locators associated with the downmix channels.

In comparison with the baseline audio decoding system 300 shown in FIG. 3, it may be considered that unit 705 in FIG. 7 fulfils the duties of units 302, 304 and 311 therein, units 702, 703 and 704 fulfil the duties (but with a different task distribution) of units 306, 309 and 310, whereas units 706 and 707 represent functionality not present in the baseline system, and no component corresponding to units 305 and 307 in the baseline system has been drawn explicitly in FIG. 7. In a variation to the example embodiment shown in FIG. 7, the energies of the audio objects could be estimated by computing the energies $E[\hat{S}_n^2]$, n=$N_B$+1, . . . , N, of the reconstructed audio objects output from the upmixer 705. This way, at the price of a certain amount of additional computational power spent in the decoding system, the bitrate of the transmitted bitstream can be decreased.

Figure 2A:
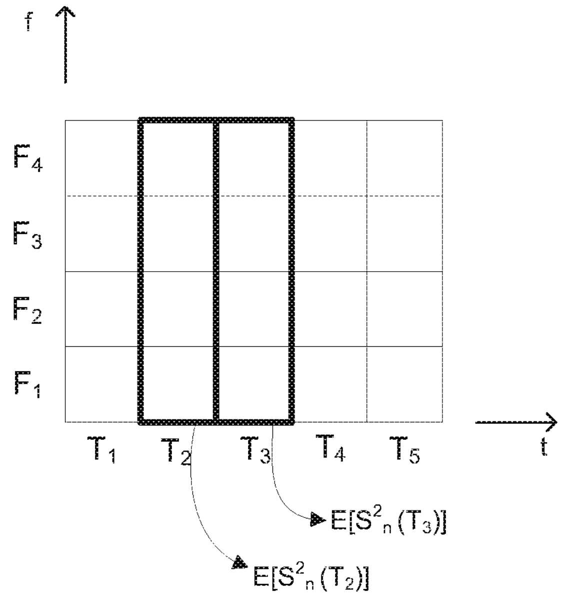
FIG. 2A illustrates a detail of a method for reconstructing bed channels; more precisely, it is a time-frequency diagram showing different signal portions in which signal energy data are computed in order to accomplish Wiener-type filtering.
Figure 2B:
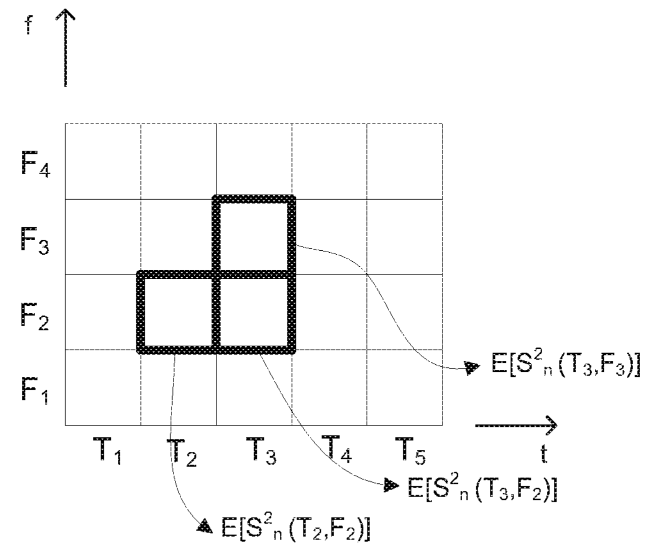
FIG. 2B is another time-frequency diagram showing different signal portions in which signal energy data are computed in order to accomplish Wiener-type filtering.
Figure 2C:
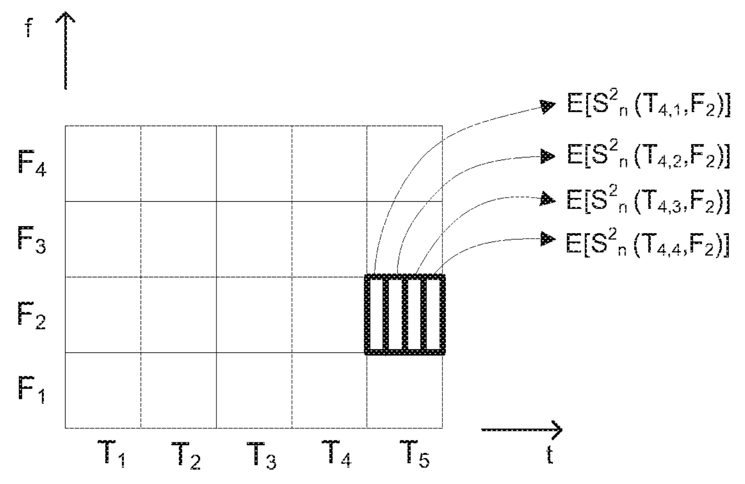
FIG. 2C is another time-frequency diagram showing different signal portions in which signal energy data are computed in order to accomplish Wiener-type filtering.

Furthermore, it is recalled that the computation of the energies of the downmix channels and the energies of the audio objects (or reconstructed audio objects) may be performed with a granularity with respect to time/frequency than the time/frequency tiles into which the audio signals are segmented. The granularity may be coarser with respect to frequency (as illustrated by FIG. 2A), equal to the time/frequency tile segmentation (FIG. 2B) or finer with respect to time (FIG. 2C). In FIG. 2, time frames are denoted $T_1$, $T_2$, $T_3$, . . . and frequency bands denoted $F_1$, $F_2$, $F_3$, . . . , whereby a time/frequency tile may be referred to by the pair $(T_l, F_k)$. In FIG. 2C, which shows a finer time granularity, a second index is used to refer to subdivisions of a time frame, such as $T_{4,1}$, $T_{4,2}$, $T_{4,3}$, $T_{4,4}$ in an example case where time frame $T_4$ is subdivided into four subframes.

FIG. 7 illustrates an example geometry of bed channels and audio channels, wherein bed channels are tied to the virtual positions of downmix channels, while it is possible to define (and redefine over time) the positions of audio objects, which are then encoded as positional metadata. FIG. 7 (where (M, N, $N_B$)=(5,7,2)) shows the virtual positions of the downmix channels, in accordance with their respective positional locators which coincide with the positions of bed channels $S_1$, $S_2$. The positions of these bed channels have been denoted $\vec{x}_1$, $\vec{x}_2$, but it is emphasized they do not necessarily form part of the positional metadata; rather, as already discussed above, it is sufficient to transmit the positional metadata associated with the audio objects only. FIG. 7 further shows a snapshot for a given point in time of the positions $\vec{x}_3$, . . . , $\vec{x}_7$ of the audio objects, as expressed by the positional metadata.

IV. Equivalents, Extensions, Alternatives and Miscellaneous

Further example embodiments will become apparent to a person skilled in the art after studying the description above. Even though the present description and drawings disclose embodiments and examples, the scope is not restricted to these specific examples. Numerous modifications and variations can be made without departing from the scope, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method for reconstructing a time frame of an audio scene with at least a plurality of N audio signals from a bitstream, the method comprising:

receiving the bitstream comprising the N audio signals signal, wherein N>1;

decoding a downmix signal from the bitstream, the downmix signal comprising M downmix channels, wherein M>1 and each downmix channel is associated with a spatial locator of a plurality of spatial locators; and reconstructing the N audio signals based on as an inner product of a plurality of correlation coefficients and the downmix signal, wherein the plurality of correlation coefficients correspond to one or more of the plurality of spatial locators.

2. A computer program product comprising a non-transitory computer-readable medium encoded with instructions configured to cause one or more processing devices to perform the method of claim 1.

3. An audio decoding system configured to reconstruct a time frame of an audio scene with at least a plurality of N audio signals from a bitstream, the system comprising:

a receiver for receiving the bitstream comprising the N audio signals signal, wherein N>1;

a decoder for decoding a downmix signal from the bitstream, the downmix signal comprising M downmix channels, wherein M>1 and each downmix channel is associated with a spatial locator of a plurality of spatial locators; and a reconstructor for reconstructing the N audio signals based on as an inner product of a plurality of correlation coefficients and the downmix signal, wherein the plurality of correlation coefficients correspond to one or more of the plurality of spatial locators.

* * * * *